United States Patent [19]

Cavin

[11] 4,002,204
[45] Jan. 11, 1977

[54] TIMING THE DEPOSITION OF AN ASPHALT PLUGGING MATERIAL FROM AN ASPHALT-CATIONIC EMULSION
[75] Inventor: Daniel C. Cavin, Houston, Tex.
[73] Assignee: Shell Oil Company, Houston, Tex.
[22] Filed: Nov. 13, 1975
[21] Appl. No.: 631,775
[52] U.S. Cl. .............................. 166/294; 61/36 D; 166/246; 166/300; 252/8.5 P
[51] Int. Cl.² ...................................... E21B 33/138
[58] Field of Search .......... 166/294, 308, 281, 283, 166/270, 246, 300; 175/65; 252/8.5 P, 8.55 R; 61/36 D, 36 R; 106/277

[56] References Cited
UNITED STATES PATENTS

| | | | |
|---|---|---|---|
| 2,681,704 | 6/1954 | Menaul | 166/281 |
| 2,801,218 | 7/1957 | Menaul | 166/308 UX |
| 3,509,950 | 5/1970 | Kazmann et al. | 175/65 |
| 3,614,985 | 10/1971 | Richardson | 166/294 |
| 3,730,272 | 5/1973 | Richardson et al. | 166/294 |
| 3,815,681 | 6/1974 | Richardson | 166/281 |
| 3,901,316 | 8/1975 | Knapp | 166/294 X |

*Primary Examiner*—Stephen J. Novosad
*Assistant Examiner*—George A. Suchfield

[57] ABSTRACT

In plugging a relatively low temperature subterranean earth formation by injecting a cationic emulsion that contains an asphalt and a pH-increasing reactant that subsequently breaks the emulsion, the timing of the emulsion breaking is improved by using a pH-increasing reactant comprising a mixture of urea and urease.

11 Claims, 3 Drawing Figures

4,002,204

TIMING THE DEPOSITION OF AN ASPHALT PLUGGING MATERIAL FROM AN ASPHALT-CATIONIC EMULSION

BACKGROUND OF THE INVENTION

The present invention relates to a process for decreasing the permeability of a permeable subterranean earth formation. More particularly, it relates to an improved process for timing a deposition of asphalt within a relatively low temperature earth formation being treated by the injection of a self-breaking cationic emulsion containing asphalt in the manner described in U.S. Pat. No. 3,901,316. The U.S. Pat. No. 3,901,316 is hereinafter referred to as the U.S. Pat. No. 3,901,316 patent and the pertinent portions of its disclosure are incorporated herein by cross-reference.

As indicated in the 3,901,316 patent, the utility of plugging the pores of subterranean earth formation is known and numerous prior procedures have been proposed for doing so by injecting asphalt-containing emulsions.

SUMMARY OF THE INVENTION

The present invention relates to plugging a subterranean earth formation by injecting an oil-in-water emulsion that contains a cationic emulsifier, asphalt dissolved or suspended in the oil phase, and a pH-increasing reactant that subsequently breaks the emulsion. In the present process, the pH-increasing reactant consists essentially of a mixture of urea and urease.

DESCRIPTION OF THE INVENTION

Figure 1:
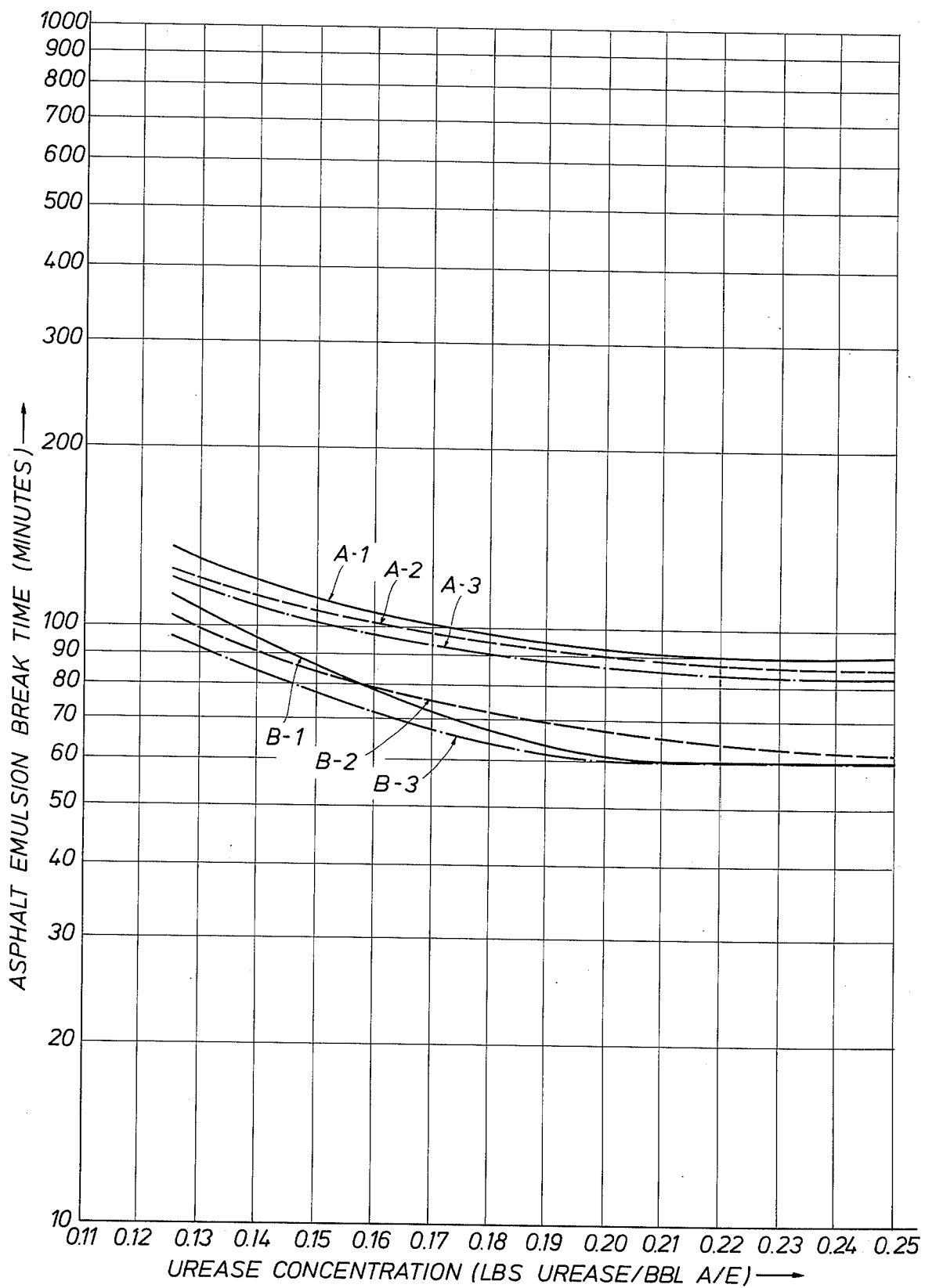
FIGS. 1 to 3 show plots of the variations of asphalt emulsion breaking times with variations in the compositions of the emulsions.

This invention involves the discovery that, particularly where the temperature of a subterranean reservoir is relatively low, the break timing of the depositing process of the 3,901,316 patent can be improved by using a mixture of urea and urease to raise the pH of the aqueous phase of the emulsion. Such a break-timing procedure is particularly useful at temperatures of from about 65° to 105° F. In the present procedure, at a given temperature, the breaking can be made increasingly sooner by using at least a critical concentration of urea and increasingly higher concentrations of urease or can be made increasingly longer by increasing the proportion of water in the emulsion.

The urea and urease materials used in the present process can be substantially any which react in the presence of an aqueous liquid (in a time and temperature controlled manner) to increase the pH of the aqueous liquid. The urease can be a purification and crystallization product of the enzyme derived from jack bean meal, the urease derived from bacteria such as Micrococcus ureae, etc., which ureases comprise an amidase enzyme which is specific for the hydrolysis of urea. Such ureases are available from companies such as Baker Chemical Company and the United States Bio-Chemical Corporation and/or comprise the active ingredient of a relatively finely ground jack bean meal, such as that available from United States Biochemical Corporation.

The asphalts (or bituminous materials) used in the present invention can be substantially any such pyrogenous distillate or tars composed mainly of hydrocarbons with small amounts of sulfur and nitrogen, oxygen or the like substituents, such as the asphalts described in the 3,901,316 patent. Particularly suitable materials are straight run asphalts having penetration values of from about 40 to 300 and softening points in the range from about 95° to 145° F. Asphalt cutbacks such as a 150 penetration grade asphalt cut with 5 to 20% diesel oil or other oil solvent are particularly suitable.

As further described in 3,901,316 patent, it is preferred that the asphalt or asphalt cutback softening point and viscosity be properly selected to enhance the tendency for depositing a plugging material within the first few inches from the face of a subterranean earth formation.

The aqueous liquid used in the present invention can be substantially any which is compatible with the emulsifier and pH-increasing reactant. Relatively low salt content and relatively soft waters are generally preferred. But, as described in the 3,901,316 patent, aqueous liquids containing small concentrations of calcium salts, or the like, can be utilized.

The cationic emulsifier can be substantially any surface active cationic material of the type described in the 3,901,316 patent. Surface active salts of amines and quaternary ammonium salts of commercially available types are suitable.

As indicated in the 3,901,316 patent, where the earth formation to be treated contains relatively large pores and/or fractures, particulate solid materials can be suspended in the present emulsions. Such particles can be composed of silica, rubber, carbonate, asphaltic or the like solid materials. Water thickening agents such as the water soluble cellulose ethers and the like can be used.

The time at a given temperature which causes the pH-increasing reactant to raise the pH of the emulsion to one at which the emulsion breaks is dependent upon numerous factors. In treating a subterranean earth formation, the severity of the time-temperature exposure of the emulsion being pumped into the formation depends on the formation temperature and the rate at which the fluid is injected into the formation. As described in the 3,901,316 patent, the pH of the emulsion can be initially adjusted to be just slightly below the pH at which the emulsion breaks in order to ensure a relatively quick breaking.

In general, the emulsion is flowed into the earth formation to be treated under sufficient pressure to force it into the formation while maintaining a relatively moderate overbalance. But, the injection pressure should be kept below the fracturing pressure of the formation. As described in 3,901,316 patent, this can readily be accomplished by using a bypass flow loop containing a means (such as a pressure relief valve) for allowing the flow to continue without fluid entering the formation, when the pressure reaches a selected value below the fracturing pressure of the formation.

LABORATORY TESTS

Buffered standard solutions of urease were prepared by mixing one gram samples of urease in 200 milliliters of a 0.1M solution of $KH_2PO_4$. Aliquot portions of those solutions were mixed with urea solutions of varying urea concentrations and allowed to react in 35 milliliters of asphalt emulsion. A comparable standard solution was also prepared by mixing one gram of jack bean meal per 100 milliliters of a buffered solution of the above composition.

FIG. 1 shows the relative independence of the asphalt emulsion break-time on the urea concentration; using samples of, respectively, prepurified urease from Baker Chemical Company and from United States Biochemical Corporation. Curves A-1, A-2, and A-3 show the asphalt emulsion break times in minutes versus the urease concentrations in pounds of urease per barrel of asphalt emulsion using the Baker Chemical Company urease. The tests were all run at 70° F and the emulsions all contained 0.1 molar $KH_2PO_4$ buffer. The urea concentrations (in pounds of urea per barrel of emulsion) were 1.98 for Curve A-1, 19.8 for Curve A-2, and 9.9 for Curve A-3.

Figure 2:
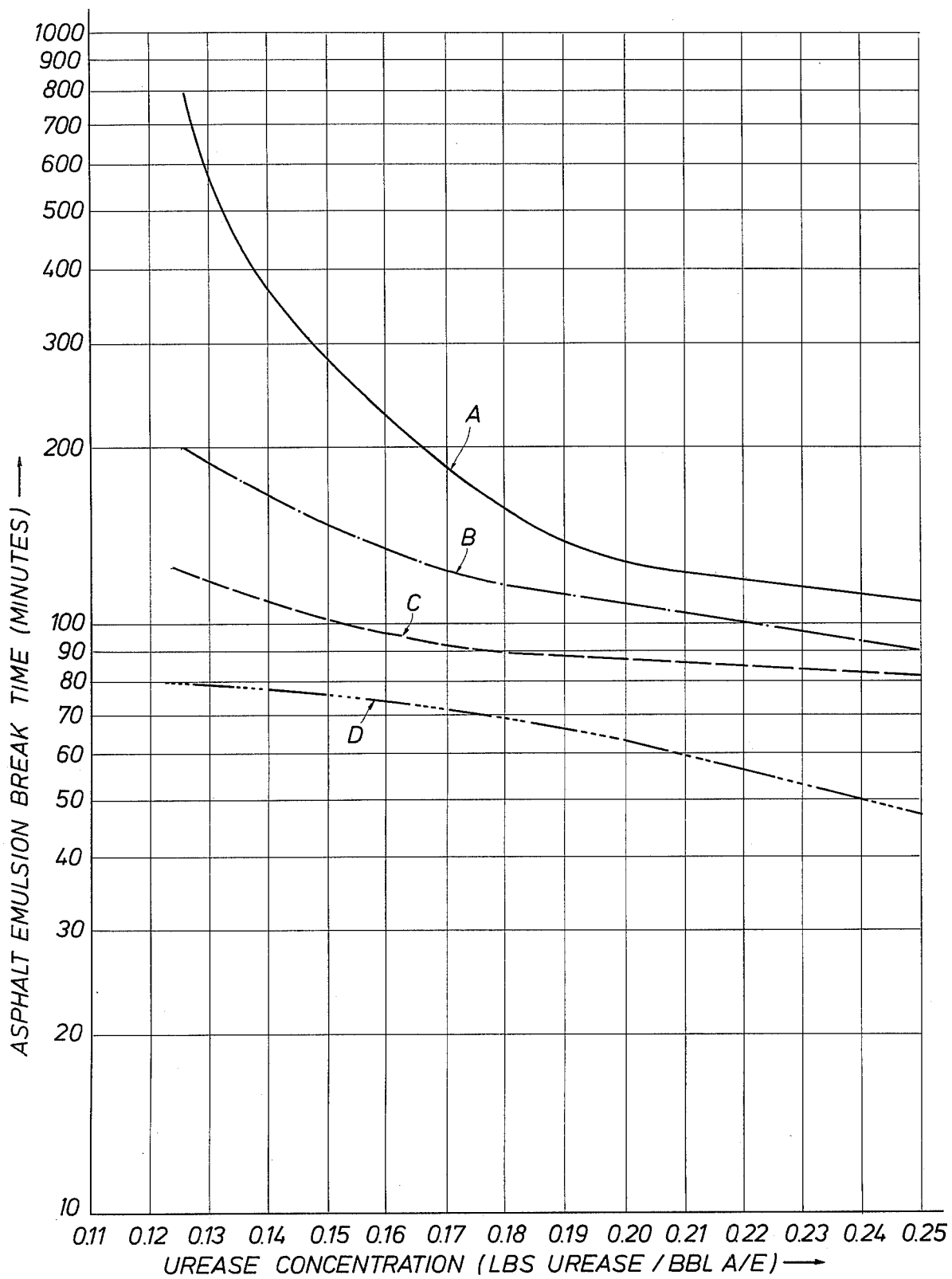

Regarding curves B-1 to B-3 the compositions and test conditions were the same, except that the urease was provided by United States Biochemical Corporation. It is apparent that the latter urease produced a faster emulsion break-time. Since the reported strengths of both samples were the same, this FIG. 2 shows the variation in asphalt emulsion break-time as a function of urease concentrations, with the emulsions containing different volume fractions of water. In each of the curves, the emulsion contained the Baker urease and 0.1 M $KH_2PO_4$ buffer at a temperature of 70° F. Each of the plotted points represents the average break-time of samples containing respectively 1.98, 9.9 and 19.8 pounds of urea per barrel of emulsion. In curve D the volume fraction of water added to the system was zero, in curve C it was 0.15, in Curve B it was 0.20, and in curve A it was 0.30. At an enzyme concentration of about 0.125 pound urease per barrel of emulsion, the effect of the added water is that of delaying the breaking. The adding of a volume fraction of water of 0.3 postponed the breaking by approximately 720 minutes (relative to the addition of no water). It is apparent that the addition of water to the urease-catalyzed urea hydrolysis system in an asphalt emulsion is an effective means of controlling the breaking time.

Figure 3:
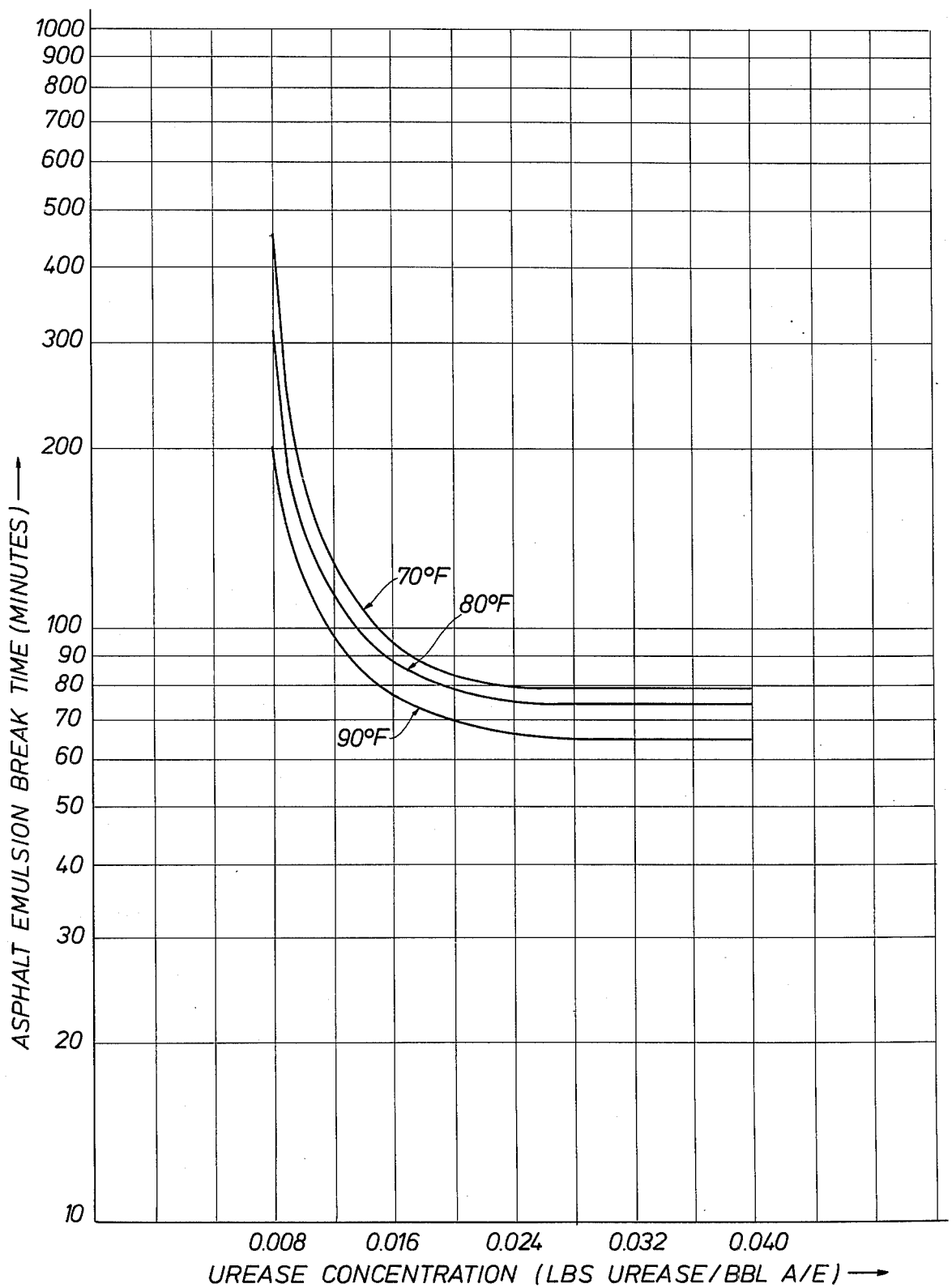

FIG. 3 shows the variation in asphalt emulsion break-time (in minutes) with increases in urease concentration (in pounds of urease per barrel of emulsion). In each curve, an emulsion containing the urease samples prepared by mixing jack bean meal with the aqueous solution of the $KH_2PO_4$ buffer (with zero volume fraction of water added) was tested at the indicated temperature. It is apparent that, at a temperature of 70° F, with an enzyme concentration of 0.008 pound urease per barrel of emulsion, the break-time is about 450 minutes, while at 90° F it is only 200 minutes. The samples were prepared by mixing jack bean meal with the aqueous system instead of using a purified urease preparation. Adequately long break times are provided without adding additional water to the system to inhibit the enzymatic activity. This improves the ease of handling a field system by eliminating the water mixing stage. The testing experience has indicated that the jack bean meal urease extract appears to maintain its activity for a longer period of time (in a buffered solution) than the prepurified urease. The cost of the jack bean meal is significantly lower than that of the prepurified urease.

What is claimed is:
1. In a process in which a cationic emulsion that contains asphalt and a pH-increasing reactant is injected into a subterranean earth formation to plug the earth formation, the improvement comprising:
   using, as the pH-increasing reactant, a mixture consisting essentially of urea and urease.
2. The process of claim 1 in which the temperature of said subterranean earth formation is from about 65° to 105° F.
3. The process of claim 1 in which the composition and concentration of the asphalt and cationic emulsifier is such that the emulsion
   a. contains dispersed particles which are small enough and well enough suspended to flow into the pores of the earth formation being treated;
   b. has a pH that is relatively near neutral; and
   c. breaks when the pH is raised by a significant amount.
4. The process of claim 1 in which an oil-phase liquid solution or dispersion of asphalt and a cationic emulsifier is mixed with the aqueous liquid prior to mixing the pH-increasing reactant.
5. The process of claim 1 in which the asphalt has a penetration grade between 40 and 300 and a softening point of from about 95° to 145° F.
6. The process of claim 1 in which the asphalt is softened by adding sufficient oil solvent to provide a softening point near but less than the temperature of the earth formation to be treated.
7. The process of claim 1 in which the emulsifier is a surface active quaternary ammonium salt capable of forming an emulsion that is relatively stable at pH of from about 4 to 8.
8. The process of claim 1 in which the emulsifier is a surface active diamine salt capable of forming an emulsion which is relatively stable at a pH of from about 2 to 4.
9. The process of claim 1 in which the pH-increasing reactant is formed by dissolving or dispersing urea and jack bean meal in water.
10. The process of claim 9 in which the concentration of urea is from about 1 to 20 pounds of urea per barrel of emulsion and the concentration of urease is from about 0.004 to 1 pound of urease per barrel of emulsion.
11. The process of claim 1 in which increasing the proportion of water in the emulsion results in longer emulsion break times.

* * * * *